(12) United States Patent
Schlecht et al.

(10) Patent No.: US 7,272,021 B2
(45) Date of Patent: *Sep. 18, 2007

(54) POWER CONVERTER WITH ISOLATED AND REGULATED STAGES

(75) Inventors: Martin F. Schlecht, Lexington, MA (US); Richard W. Farrington, Heath, TX (US)

(73) Assignee: SynQor, Inc., Boxborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/407,699

(22) Filed: Apr. 20, 2006

(65) Prior Publication Data

US 2006/0262575 A1  Nov. 23, 2006

Related U.S. Application Data

(60) Continuation-in-part of application No. 10/729,430, filed on Dec. 5, 2003, now Pat. No. 7,050,309, which is a continuation-in-part of application No. 10/812,314, filed on Mar. 29, 2004, now Pat. No. 7,072,190, which is a continuation of application No. 10/359,457, filed on Feb. 5, 2003, now Pat. No. 6,731,520, which is a division of application No. 09/417,867, filed on Oct. 13, 1999, now Pat. No. 6,222,742, which is a division of application No. 09/012,475, filed on Jan. 23, 1996, now Pat. No. 5,999,417, which is a continuation of application No. 09/821,655, filed on Mar. 29, 2001, now Pat. No. 6,594,159.

(60) Provisional application No. 60/431,673, filed on Dec. 6, 2002, provisional application No. 60/036,245, filed on Jan. 24, 1997.

(51) Int. Cl.
*H02M 3/335* (2006.01)

(52) U.S. Cl. ........................... 363/17; 363/97

(58) Field of Classification Search ................. 363/16, 363/18, 20, 21.01, 95, 97, 125, 131, 17
See application file for complete search history.

(56) References Cited

U.S. PATENT DOCUMENTS 3,663,941 A    5/1972 Pasciutti (Continued)

FOREIGN PATENT DOCUMENTS

| EP | 0 549 920 B1 | 7/1993 |
|---|---|---|
| EP | 1231705 A2 | 8/2002 |
| JP | 06315263 A | 11/1994 |
| WO | WO88/09084 A1 | 11/1988 |

OTHER PUBLICATIONS

Mweene, L. Haachitaba, et al., "A High-Efficiency 1.5 kW, 390-50 V Half-Bridge Converter Operated at 100% Duty-Ratio,"IEEE, 1992, pp. 723-730.

(Continued)

*Primary Examiner*—Adolf Berhane
(74) *Attorney, Agent, or Firm*—Hamilton, Brook, Smith & Reynolds, P.C.

(57) ABSTRACT

In a power converter, the duty cycle of a primary winding circuit causes near continuous flow of power through the primary and secondary winding circuits during normal operation. By providing no regulation during normal operation, a very efficient circuit is obtained with a synchronous rectifier in the secondary operating at all times. However, during certain conditions such as start up or a short-circuit, the duty cycle of the primary may be reduced to cause freewheeling periods. A normally non-regulating isolation stage may be followed by plural non-isolating regulation stages. To simplify the gate drive, the synchronous rectifiers may be allowed to turn off for a portion of the cycle when the duty cycle is reduced. A filter inductance of the secondary winding circuit is sufficient to minimize ripple during normal operation, but allows large ripple when the duty cycle is reduced. By accepting large ripple during other than normal operation, a smaller filter inductance can be used.

48 Claims, 8 Drawing Sheets

U.S. PATENT DOCUMENTS

| | | | |
|---|---|---|---|
| 4,438,411 | A | 3/1984 | Rubin et al. |
| 4,586,119 | A | 4/1986 | Sutton |
| 4,788,450 | A | 11/1988 | Wagner |
| 4,788,634 | A | 11/1988 | Schlecht et al. |
| 4,812,672 | A | 3/1989 | Cowan et al. |
| 5,019,954 | A | 5/1991 | Bourgeault et al. |
| 5,179,512 | A | 1/1993 | Fisher et al. |
| 5,274,543 | A | 12/1993 | Loftus, Jr. |
| 5,303,138 | A | 4/1994 | Rozman |
| 5,343,383 | A | 8/1994 | Shinada et al. |
| 5,396,412 | A | 3/1995 | Barlage |
| 5,442,534 | A | 8/1995 | Cuk et al. |
| 5,513,092 | A | 4/1996 | Goebel |
| 5,528,480 | A | 6/1996 | Kikinis et al. |
| 5,528,482 | A | 6/1996 | Rozman |
| 5,621,621 | A | 4/1997 | Lilliestrale |
| 5,625,541 | A | 4/1997 | Rozman |
| 5,663,887 | A | 9/1997 | Warn et al. |
| 5,726,869 | A | 3/1998 | Yamashita et al. |
| 5,771,160 | A | 6/1998 | Seong |
| 5,774,350 | A | 6/1998 | Notaro et al. |
| 5,870,299 | A | 2/1999 | Rozman |
| 5,872,705 | A | 2/1999 | Loftus, Jr. et al. |
| 5,880,949 | A | 3/1999 | Melhem et al. |
| 5,959,370 | A | 9/1999 | Pardi |
| 5,999,417 | A | 12/1999 | Schlecht |
| 6,016,258 | A | 1/2000 | Jain et al. |
| 6,046,920 | A | 4/2000 | Cazabat et al. |
| 6,066,943 | A | 5/2000 | Hastings et al. |
| 6,088,329 | A | 7/2000 | Lindberg et al. |
| 6,252,781 | B1 | 6/2001 | Rinne et al. |
| 6,487,093 | B1 | 11/2002 | Vogman |
| 6,504,267 | B1 | 1/2003 | Giannopoulos |
| 6,552,917 | B1 | 4/2003 | Bourdillon |
| 6,700,365 | B2 | 3/2004 | Isham et al. |
| 6,728,118 | B1 | 4/2004 | Chen et al. |
| 6,735,094 | B2 | 5/2004 | Steigerwald et al. |
| 6,853,568 | B2 | 2/2005 | Li et al. |
| 7,050,309 | B2 * | 5/2006 | Farrington .................. 363/17 |
| 7,072,190 | B2 | 7/2006 | Schlecht |
| 2003/0174522 | A1 | 9/2003 | Xu et al. |
| 2005/0047177 | A1 | 3/2005 | Tobita |
| 2006/0209572 | A1 | 9/2006 | Schlecht |
| 2006/0285368 | A1 | 12/2006 | Schlecht |

OTHER PUBLICATIONS

Mweene, Loveday Haachitaba, "The Design of Front-End DC-DC Converters of Distributed Power Supply Systems with Improved Efficiency and Stability," Thesis, Massachusetts Institute of Technology, Sep. 1992, pp. 1-184.

Casey, Leo Francis, "Circuit Design For 1-10 MHZ DC-DC Conversion," MIT Doctoral Thesis, Jan. 1989, pp. 1-216.

Ferencz, Andrew, "A 250 W High Density Point-of-Load Converter," MIT Master of Science Thesis, Sep. 1989, pp. 1-117.

Mohandes, Bijan, MOSFET Synchronous Rectifiers Achieve 90% Efficiency—Part I and Part II, PCIM, Jun. 1991, pp. 10-13 & 55-61.

Cobos, J.A., et al., "Resonant Reset Forward Topologies for Low Output Voltage On Board Converters," IEEE, 1994, pp. 703-708.

Tabisz, W.A., et al., "A MOSFET Resonant Synchronous Rectifier for High-Frequency DC/DC Converters," Proceedings of the Power Electronics Specialists Conference, San Antonio, TX, Jun. 10-15, 1990, pp. 769-779.

Wiegman, H.L.N., et al., "A Dual Active Bridge SMPS Using Synchronous Rectifiers," HFPC May 1990 Proceedings, pp. 336-346.

Shoyama, Masahito, et al., "Zero-Voltage-Switching Realized by Magnetizing Current of Transformer in Push-Pull Current-Fed DC-DC Converter," IEEE, 1993, pp. 178-184.

Shoyama, Masahito, et al., "Zero-Voltage-Switched Push-Pull DC-DC Converter," IEEE, 1991, pp. 223-229.

Xiao, Li, et al, "Soft Switched PWM DC/DC Converter With Synchronous Rectifiers," IEEE 1996, pp. 476-484.

Blanchard, Richard, et al., "The Design of a High Efficiency, Low Voltage Power Supply Using MOSFET Synchronous Rectification and Current Mode Control," IEEE, 1985, pp. 355-361.

Jitaru, Ionel Dan, et al, "High Efficiency DC-DC Converter," IEEE, 1994, pp. 638-644.

Harper, D.J., et al., "Controlled Synchronous Rectifier," HFPC May 1988 Proceedings, pp. 165-172.

Acker, Brian, et al., "Current-Controlled Synchronous Rectification," IEEE 1994, pp. 185-191.

Murakami, Naoki, et al., "A High-Efficiency 30-W Board Mounted Power Supply Module," IEEE 1991, pp. 122-127.

Casey, Leo F., et al., "A High Frequency, Low Volume, Point-of-Load Power Supply for Distributed Power Systems," IEEE 1987, pp. 439-450.

Schlecht, Martin F., "Research Results from the Study of A High Efficiency, Highly Manufacturable DC-DC Converter," unpublished, pp. 1-32.

Gachora, John Mburu, "Design of a Four-Phase Switchmode High Efficiency Power Supply," MIT Master of Engineering Thesis, 1994, pp. 1-66.

Blanchard R., et al., "MOSFETs Move In On Low Voltage Rectification," Official Proceedings of the Ninth International PCI '84 Conference, Oct. 29-31, 1984, pp. 213-222.

Garcia, O. et al., "Zero Voltage Switching In The PWM Half Bridge Topology With Complementary Control And Synchronous Rectification," Record of the Annual Power Electronics Specialist Conference, Pesc, Atlanta, Jun. 12-15, 1995, vol. 1, No. CONF. 26, Jun. 12, 1995, IEEE, pp. 286-291.

* cited by examiner

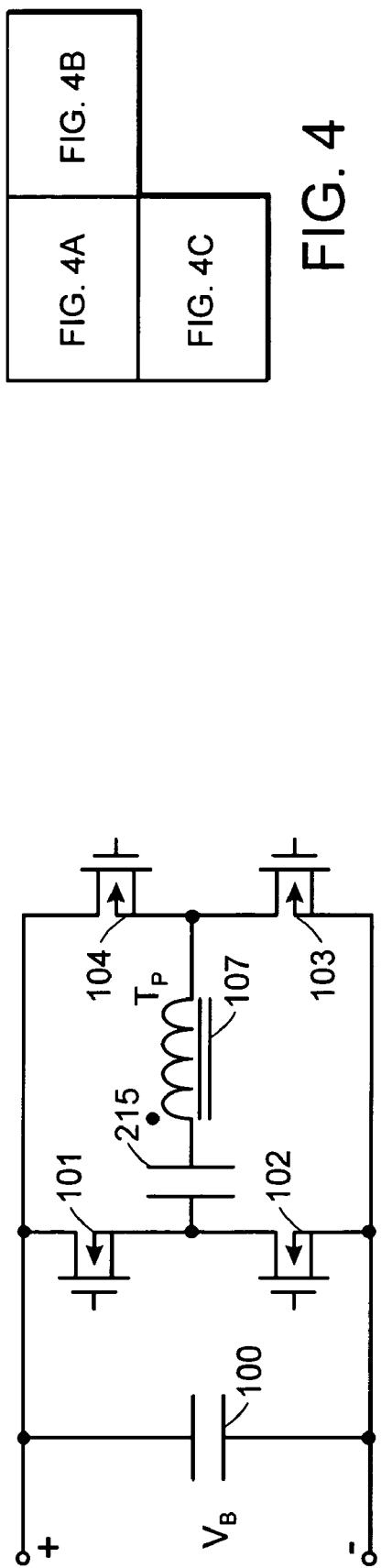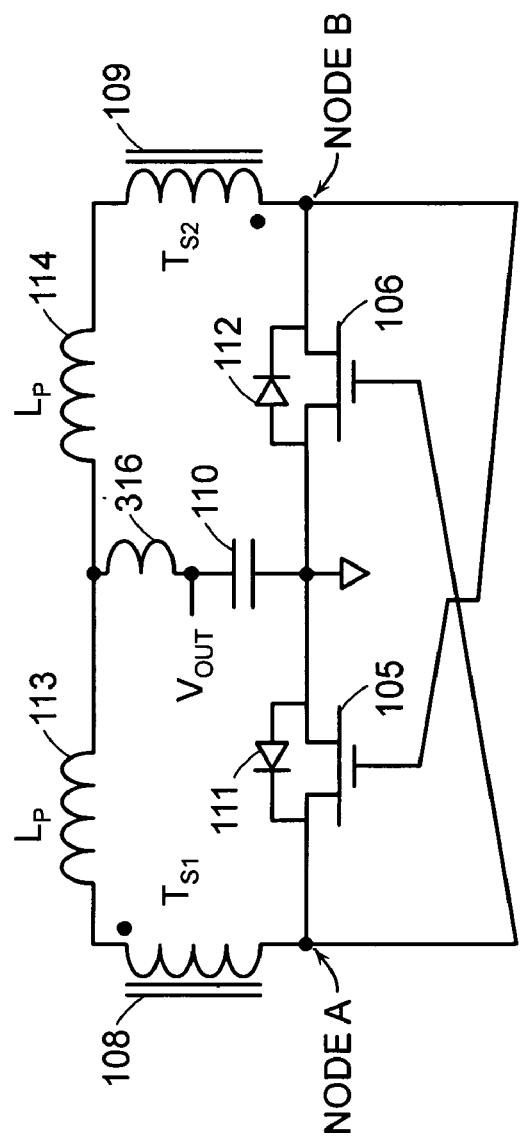
FIG. 4
FIG. 3

US 7,272,021 B2

POWER CONVERTER WITH ISOLATED AND REGULATED STAGES

RELATED APPLICATIONS

This application is a Continuation-in-Part of U.S. application Ser. No. 10/729,430, filed on Dec. 5, 2003 now U.S. Pat. No. 7,050,309, which claims the benefit of U.S. Provisional Application No. 60/431,673, filed Dec. 6, 2002 and a Continuation-in-Part to U.S. application Ser. No. 10/812, 314, filed Mar. 29, 2004 now U.S. Pat. No. 7,072,190, which is a continuation of application Ser. No. 10/359,457, filed Feb. 5, 2003 now U.S. Pat. No. 6,731,520, which is a continuation of application Ser. No. 09/821,655, filed Mar. 29, 2001, now U.S. Pat. No. 6,594,159, which is a divisional of application Ser. No. 09/417,867, filed Oct. 13, 1999, now U.S. Pat. No. 6,222,742, which is a divisional of Ser. No. 09/012,475, filed Jan. 23, 1998, now U.S. Pat. No. 5,999, 417, which claims the benefit of U.S. Provisional Application 60/036,245 filed Jan. 24, 1997. The entire teachings of the above applications are incorporated herein by reference.

BACKGROUND OF THE INVENTION

This invention pertains to switching power converters. A specific example of a power converter is a DC-DC power supply that draws 100 watts of power from a 48 volt DC source and converts it to a 5 volt DC output to drive logic circuitry. The nominal values and ranges of the input and output voltages, as well as the maximum power handling capability of the converter, depend on the application.

It is common today for switching power supplies to have a switching frequency of 100 kHz or higher. Such a high switching frequency permits the capacitors, inductors, and transformers in the converter to be physically small. The reduction in the overall volume of the converter that results is desirable to the users of such supplies.

Another important attribute of a power supply is its efficiency. The higher the efficiency, the less heat that is dissipated within the supply, and the less design effort, volume, weight, and cost that must be devoted to remove this heat. A higher efficiency is therefore also desirable to the users of these supplies.

A significant fraction of the energy dissipated in a power supply is due to the on-state (or conduction) loss of the diodes used, particularly if the load and/or source voltages are low (e.g. 3.3, 5, or 12 volts). In order to reduce this conduction loss, the diodes are sometimes replaced with transistors whose on-state voltages are much smaller. These transistors, called synchronous rectifiers, are typically power MOSFETs for converters switching in the 100 kHz and higher range.

The use of transistors as synchronous rectifiers in high switching frequency converters presents several technical challenges. One is the need to provide properly timed drives to the control terminals of these transistors. This task is made more complicated when the converter provides electrical isolation between its input and output because the synchronous rectifier drives are then isolated from the drives of the main, primary side transistors. Another challenge is the need to minimize losses during the switch transitions of the synchronous rectifiers. An important portion of these switching losses is due to the need to charge and discharge the parasitic capacitances of the transistors, the parasitic inductances of interconnections, and the leakage inductance of transformer windings.

SUMMARY OF THE INVENTION

In certain embodiments of the invention, a power converter system comprises a normally non-regulating isolation stage and a plurality of non-isolating regulation stages, each receiving the output of the isolation stage and regulating a regulation stage output. The non-regulating isolation stage may comprise a primary winding circuit and a secondary winding circuit coupled to the primary winding circuit. The secondary winding circuit comprises a secondary transformer winding in series with a controlled rectifier having a parallel uncontrolled rectifier. A control circuit controls duty cycle of the primary winding circuit, the duty cycle causing substantially uninterrupted control of power through the primary and secondary winding circuits during normal operation.

The duty cycle of the primary winding circuit may be reduced to cause freewheeling periods in other than normal operation. Duty cycle might be reduced during the startup or to limit current and may be a function of sensed current.

The primary winding circuit may include a single primary winding, and the secondary winding circuit may include plural secondary windings coupled to the single primary winding. The primary winding may be in a full bridge circuit having a capacitor in series with the primary winding. In one implementation of the full bridge circuit, during freewheeling, only two top FETs or two bottom FETs are turned off.

A control signal of the controlled rectifier may be derived from a waveform of the secondary winding circuit. The secondary winding circuit may include a filter inductor and have a capacitor coupled across its output.

The isolation stage may be a step down stage. For example, it may provide an output of about 12 volts from a DC power source that provides a voltage varying over the range of 36–75 volts. The regulation stages may be down converters to provide outputs of voltage levels to drive logic circuitry. A regulation stage output may, for example, be 5 volts or less, such as 3.3 volts.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates the addition of an output filter inductor to the circuit of FIG. 2.

DETAILED DESCRIPTION OF THE INVENTION

A description of preferred embodiments of the invention follows.

Figure 1:
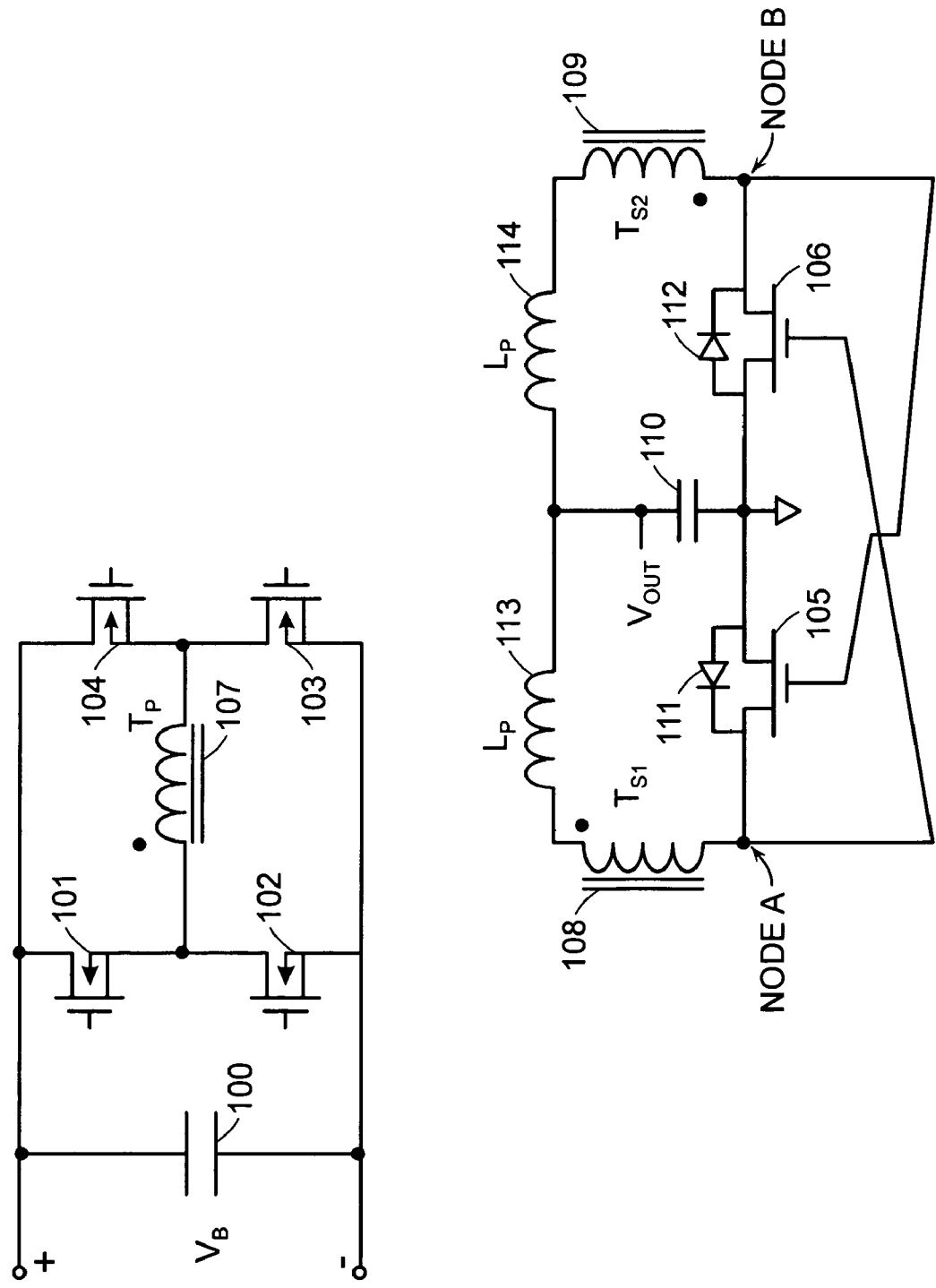
FIG. 1 shows a full-bridge, single-transformer, voltage-fed isolation stage that incorporates concepts of the '417 patent.

FIG. 1 shows a full-bridge, single-transformer, voltage-fed isolation stage that incorporates synchronous rectification and the concepts of the '417 patent. The operation of this isolation stage is as follows. For the first half of the cycle, MOSFETs 101 and 103 are turned on while MOSFETs 102 and 104 are left off, and the voltage $V_B$ is applied positively (according to the "dot" convention) across the transformer's primary winding 107. This voltage, modified by the transformer's turns-ratio, appears across the secondary windings with the appropriate polarity. Power flows into the transformer's primary winding, and out of the first secondary winding 108 to the output. The voltage at Node B is approximately twice the output voltage, and it causes the MOSFET synchronous rectifier 105 to be turned on. The voltage at Node A is therefore slightly below ground, which causes the MOSFET synchronous rectifier 106 to be turned off. These states of the rectifier switches are consistent with the power flowing out of the first secondary winding.

During the second half of the cycle, MOSFETs 102 and 104 are turned on while MOSFETs 101 and 103 are left off, and the voltage $V_B$ is applied negatively across the transformer's primary winding. This negative polarity causes MOSFET 106 to be turned on, MOSFET 105 to be turned off, and power to flow into the primary winding and out of the second secondary winding 109 to the output across capacitor 110.

The secondary windings are not tightly coupled to each other, as indicated with the parasitic inductances 113 and 114, to achieve the advantages discussed in the '417 patent. A similar setup was shown in the topology of FIG. 9 of the '417 patent since it also used a single transformer.

Figure 2:
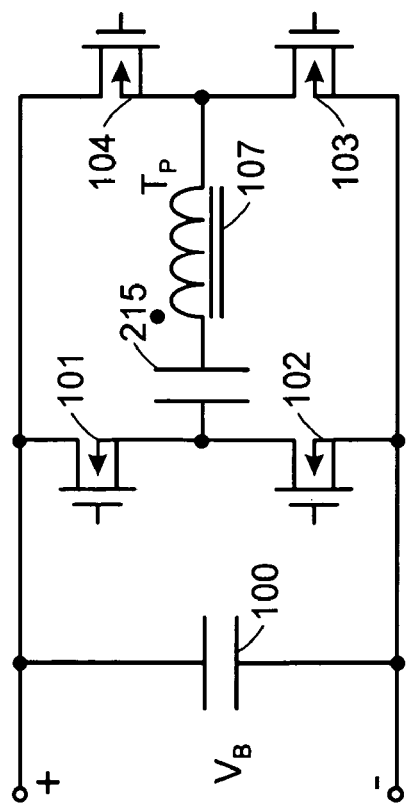
FIG. 2 illustrates the addition of a capacitor to the primary winding of FIG. 1.
Figure 2:
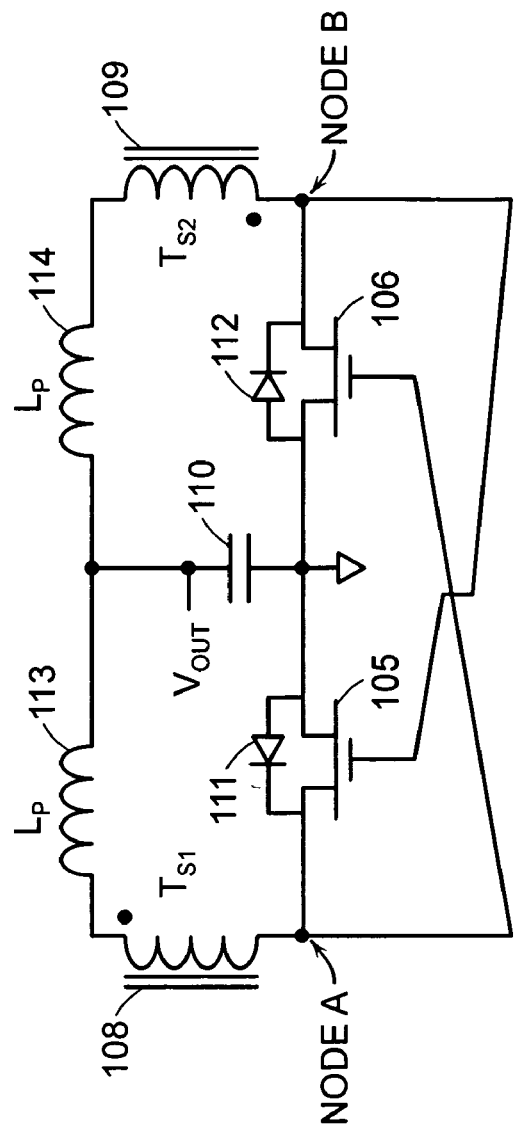

Care must be taken in this isolation stage topology to insure that the magnetizing inductance of the transformer does not saturate. One way to do this is to place a large capacitor 215 in series with the primary winding, as shown in FIG. 2. This capacitor will assume a dc voltage across it that counters any imbalance there may be in the positive and negative volt-seconds of the waveforms created by MOSFETs 101–104. Alternatively, several well-known techniques to sense the magnetizing inductor's current could be used to modify the durations of the first and second halves of the cycle.

The filters at the output of the isolation stages in the '417 patent are composed of one or more capacitive and inductive elements. When the isolation stage is voltage-fed, it may be desirable to have the output filter begin with an inductor 316, as shown in FIG. 3. One benefit this approach provides is that the voltage-fed isolation stages can now be operated with a variable duty cycle control strategy to provide a soft-start capability or to limit current flow in a short-circuit condition. These functions could be provided by the regulation stages in the topologies depicted in the '417 patent, but if the isolation stage is not combined directly with a regulation stage in a single product, then it may be desirable to include these functional capabilities in the isolation stage, as well.

Under variable duty cycle control, the percentage of the overall cycle (the duty cycle) that MOSFETs 101 and 103 (or MOSFETs 102 and 104) conduct is reduced from the 50% value described above. For the remaining, freewheeling fraction of the half-cycle, either all of the primary-side MOSFETs are turned off, or at least the two top MOSFETs 101 and 104 or the two bottom MOSFETs 102 and 103 are turned off. During the freewheeling part of the cycle, both diodes 111 and 112 conduct the current flowing through inductor 316, and the voltage across the transformer windings is approximately zero. As is well know, this additional portion of the cycle permits the output voltage to be less than $V_B$ divided by the transformer's turns-ratio. How much less depends on the duty cycle. Since during normal operation the isolation stage is operated at a fixed duty cycle in which power is always flowing from input to output (except during the brief switch transitions), the value of inductor 316 can be relatively small to achieve an acceptable output ripple. This reduces the size, cost, and power dissipation of this inductor compared to what it might have been. During those times when the isolation stage is operated under a variable duty cycle, the ripple in the inductor current may then become large, but the larger output voltage ripple that results can usually be tolerated for start-up and short-circuit conditions.

As mentioned above, during the freewheeling part of the cycle the diodes are carrying the inductor current. This is because the gate drive scheme shown in FIG. 3 would cause the MOSFET synchronous rectifiers to be off during this part of the cycle. The additional power dissipation that occurs due to the higher on-state voltage of the diodes compared to that of the MOSFETs can usually be tolerated for the start-up and short-circuit conditions because they are normally short in duration.

Figure 4A:
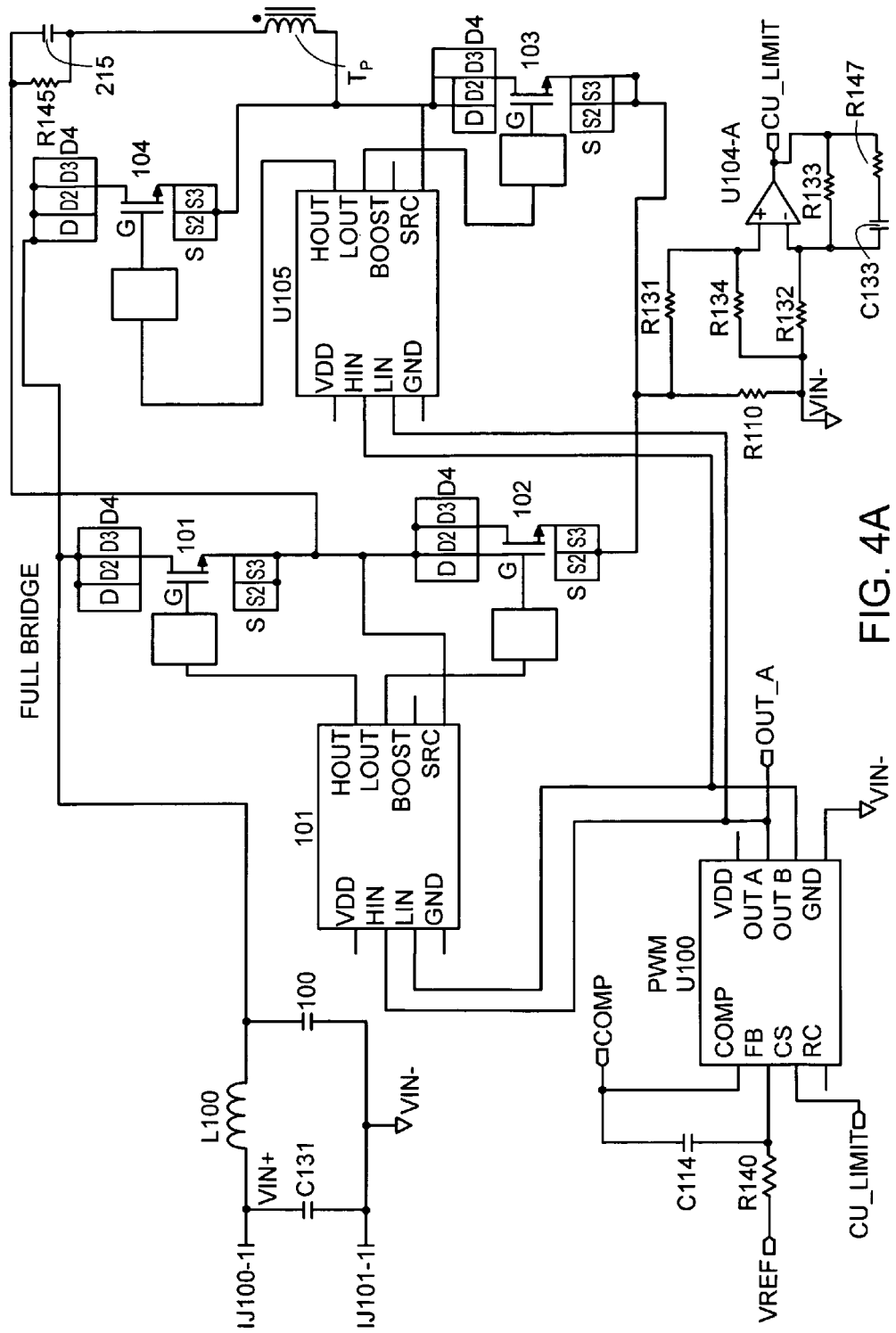
FIGS. 4A–4C show a control circuit for the circuits of FIGS. 1–3 and embodying the present invention.
Figure 4B:
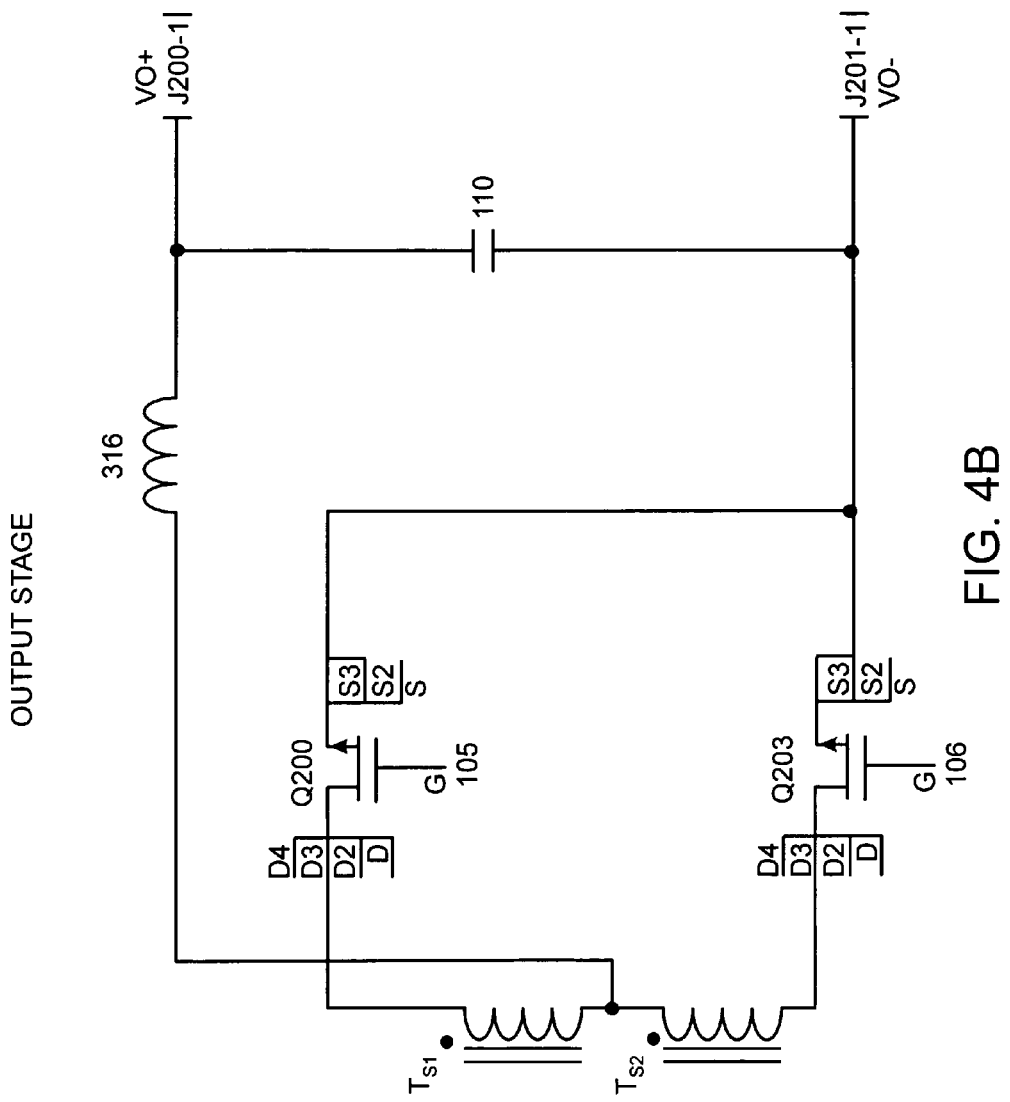
Figure 4C:
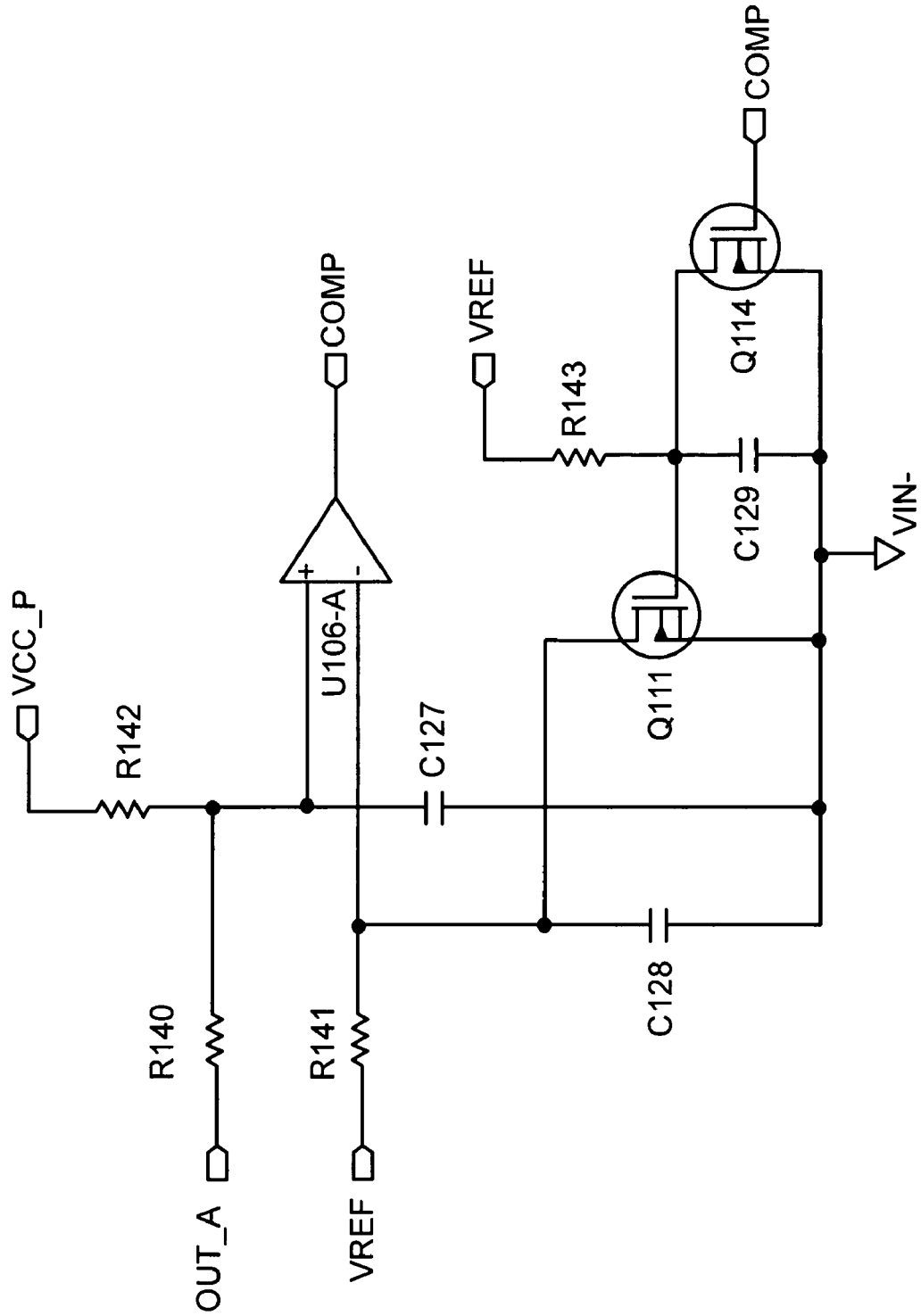

If the output voltage is high, then it may be desirable to use a capacitive divider technique described in the '417 patent to reduce the voltages applied to the gates of the MOSFET synchronous rectifiers below that of the voltages appearing at Nodes A and B. FIGS. 4A–4C show a circuit schematic of a product based, in part, on the ideas presented here and in the '417 patent. The function of the product is to provide isolation and a transformation of the input voltage to the output voltage according to the turns-ratio of the transformer. It does not, in its normal state of operation, provide regulation. As such it is a very efficient product. One example of its use is to convert a 48V input to a 12V output by using a turns-ratio of 4:1. Since there is no regulation, if the input voltage varies +/−10%, so too will the output voltage vary +/−10%. In certain applications, this variation in the output is acceptable, and well worth the very high efficiency of the converter, which is 96% in this example.

In addition, since the converter of FIG. 4 does not provide regulation, its output voltage demonstrates a droop characteristic. By this it is meant that for any given input voltage, the output voltage drops slightly as the output current increases. For instance, the output voltage may drop 5% as the output current varies from 0% to 100% of the rated maximum value. This droop characteristic provides automatic current sharing between two or more such converters that might be place in parallel.

Note in this schematic that the IC labeled U100 is a pulse width modulator (PWM) control chip that is normally operated such that the gate drive signals that pass through gate drivers U101 and U105 give the fixed duty cycle operation of the full-bridge described above. If the current sensing amplifier U104-A senses that the current flowing on the primary side of the circuit exceeds a threshold value, it commands the PWM control chip to reduce its duty cycle by an amount determined by how large the current gets above the threshold value. This provides a current limiting scheme for the product that protects against a short-circuit condition.

Note also that comparator U106-A senses the duty cycle output of the PWM control chip, and compares it to a threshold. If the duty cycle falls below this threshold value, the output of the comparator causes the PWM control IC to shut down. The circuitry around this comparator, including transistors Q111 and Q114, provides a latching mechanism such that the PWM control IC remains off once this condition is observed.

Figure 5:
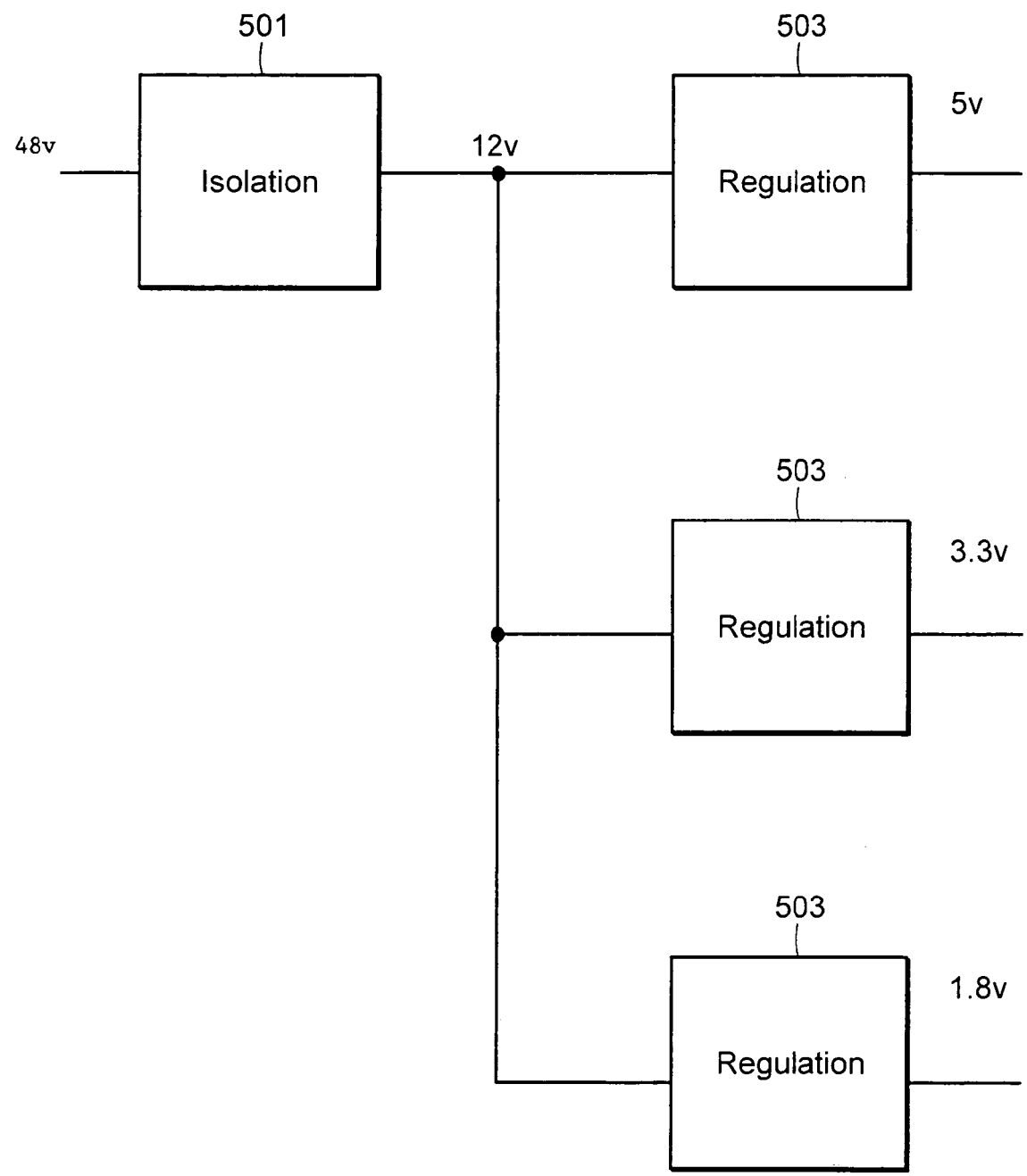
FIG. 5 shows an Intermediate Bus Architecture (IBA) implementation of the invention.

As described in the '417 patent and illustrated in FIG. 5, in some situations, it may be desirable to place the isolation stage first in the power flow, and to have the regulation stage follow. For example, when there are many outputs sharing the total power, the circuit might be configured as one isolation/step-down (or step-up) stage 501 followed by several DC-DC switching or linear regulators 503.

The DC power source to the full bridge primary circuit may provide a voltage that varies over the range of 36–75 volts. The output of the isolation stage may be 12 volts, and the regulation stage output may be 5 volts or less. In particular, the regulation stage output may be 3.3 volts. Typically, the regulation stage output is of a voltage level to drive logic circuitry.

Because the isolation stage uses synchronous rectifiers, it is possible for the current to flow from the output back to the input if, for a given input voltage and duty cycle, the output voltage is too high. This condition might, for example, occur during start-up where the duty cycle is slowly raised from its minimum value to its maximum value, but the output capacitor is already pre-charged to a high voltage, perhaps because it had not fully discharged from a previous on-state condition. It might also occur when the input voltage suddenly decreases while the output voltage remains high due to the capacitors connected to this node.

The negative current that results could cause destructive behavior in the converter or in the system if it is not kept small enough.

One way to avoid this condition is to turn off either just the top two primary-side MOSFETs 101 and 104, or just the bottom two primary-side MOSFETs 102 and 103, during the freewheeling period, as described above. By leaving the other two primary-side MOSFETs on, the voltage across the primary and secondary windings of the transformer is guaranteed to be essentially zero during the freewheeling period. Given the gate drive scheme shown in FIG. 3, this, in turn, ensures the controlled rectifiers will be off during this part of the cycle.

Figure 4D:
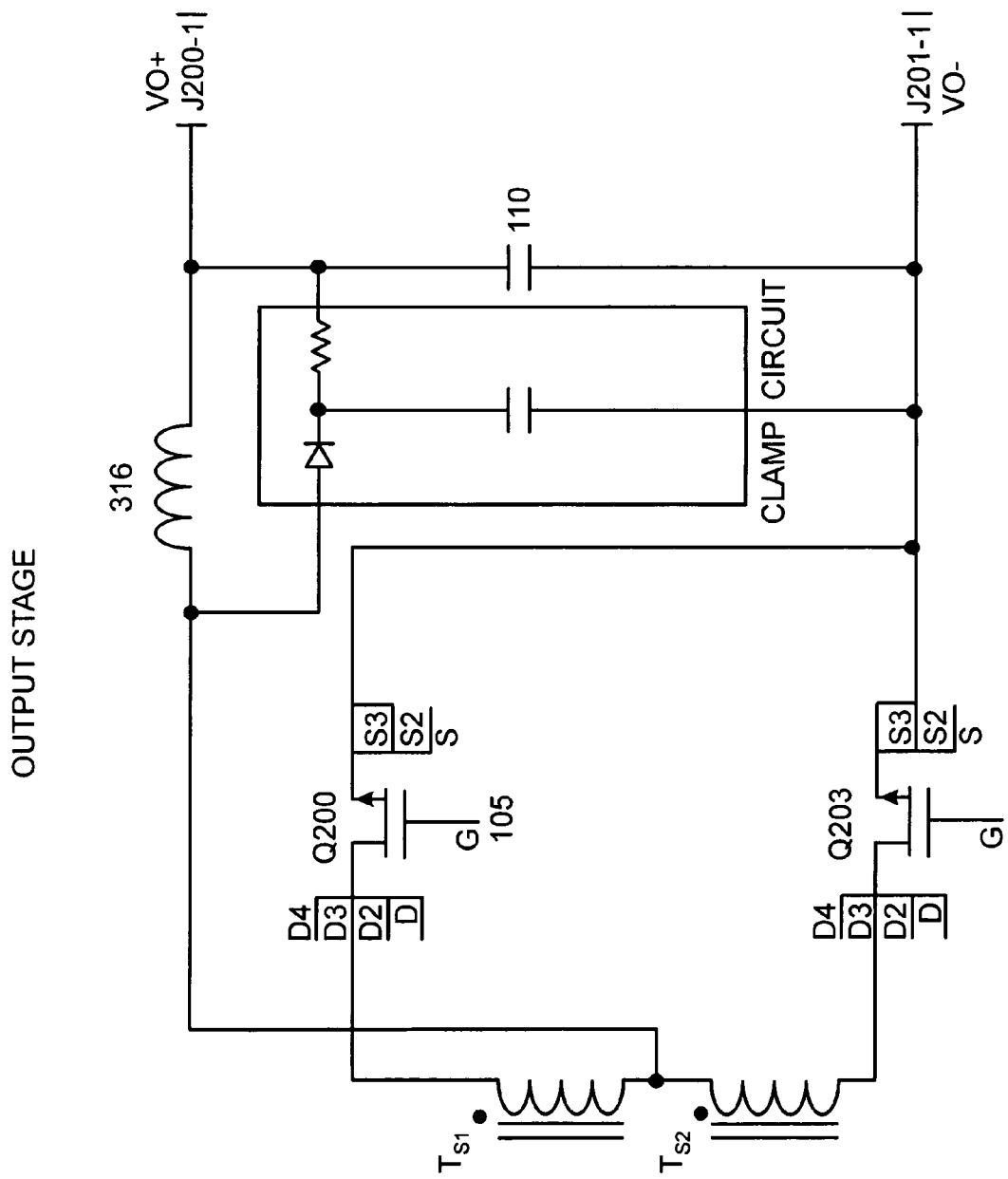
FIG. 4D shows an alternative to the circuit of FIG. 4B.

With the controlled rectifiers off, negative current cannot flow during the freewheeling period. Negative current can flow during the non-freewheeling part of the cycle, but since it must always start at zero, its value is limited to the ripple that the inductor permits, which is typically small enough to not cause a problem. This negative current will be reset to zero at the start of each freewheeling period, either by providing a clamp circuit, as shown in FIG. 4D, or by allowing the controlled rectifiers to avalanche and act as their own clamp. Since the clamp circuit must only work for a short duration, it need not recover its absorbed energy and so can be simple, such as the one shown in FIG. 4D.

To limit the negative current, the isolation stage could operate in a reduced duty-cycle mode. While the control circuit is typically designed to achieve this mode during start-up and shutdown of the isolation stage, it is not the normal mode of operation. If, during normal operation, the input voltage drops suddenly, a large negative current can flow because there are no freewheeling periods.

To avoid this condition, the current flowing through the converter can be sensed, either by sensing the load current directly, or by sensing a signal indicative of the load current. When the load current falls below some threshold, the duty cycle of the isolation stage can be reduced from its maximum value to provide freewheeling periods. Given the drive scheme for the primary-side MOSFETs outlined above, the negative current will then be kept small since the controlled rectifiers will be turned off for a portion of the cycle.

While this invention has been particularly shown and described with references to preferred embodiments thereof, it will be understood by those skilled in the art that various changes in form and details may be made therein without departing from the scope of the invention encompassed by the appended claims. For example, whereas the Figures show the secondary side rectification circuit arranged in a center tapped configuration with two secondary windings and two synchronous rectifiers, as is well known it could be a full wave rectification configuration. One could use a full-bridge rectification circuit in which there is only one secondary winding and four synchronous rectifiers. Such a circuit reduces voltage stress on the synchronous rectifiers when they are off by a factor of two during normal operation of the converter.

What is claimed is:

1. A power converter system comprising:
  a normally non-regulating isolation stage comprising:
    a primary winding circuit;
    a secondary winding circuit coupled to the primary winding circuit, the secondary winding circuit comprising a secondary transformer winding in series with a controlled rectifier having a parallel uncontrolled rectifier, the secondary winding circuit providing a normally non-regulated output of the isolation stage; and
    a control circuit which controls duty cycle of the primary winding circuit, the duty cycle causing substantially uninterrupted flow of power through the primary and secondary winding circuits during normal operation; and
  a plurality of non-isolating regulation stages, each receiving the non-regulated output of the isolation stage and regulating a regulation stage output.

2. A power converter system as claimed in claim 1 wherein the duty cycle of the primary winding circuit is reduced to cause freewheeling periods in other than normal operation.

3. A power converter system as claimed in claim 2 wherein the controlled rectifiers are caused to be off during a portion of each cycle when the duty cycle is reduced.

4. A power converter system as claimed in claim 3 wherein the duty cycle is a function of sensed current.

5. A power converter system as claimed in claim 4 wherein the duty cycle is reduced to limit current.

6. A power converter system as claimed in claim 2 wherein the duty cycle is reduced during start up.

7. A power converter system as claimed in claim 2 wherein the duty cycle is a function of sensed current.

8. A power converter system as claimed in claim 7 wherein the duty cycle is reduced to limit current.

9. A power converter system as claimed in claim 1 wherein the secondary winding circuit comprises plural secondary transformer windings.

10. A power converter system as claimed in claim 1 wherein the primary winding circuit includes a single primary winding and the secondary winding circuit includes two secondary windings coupled to the single primary winding.

11. A power converter system as claimed in claim 10 wherein the primary winding is in a full bridge circuit.

12. A power converter system as claimed in claim 11, further comprising a capacitor in series with the primary winding.

13. A power converter as claimed in claim 11 wherein, during freewheeling, only two top FETs of the full bridge current are turned off.

14. A power converter as claimed in claim 11 wherein, during freewheeling, only two bottom FETs of the full bridge current are turned off.

15. A power converter system as claimed in claim 1 further comprising a capacitor coupled across an output of the secondary winding circuit.

16. A power converter system as claimed in claim 1 wherein a control signal of the controlled rectifier is derived from a waveform of the secondary winding circuit.

17. The power converter system as claimed in claim 1 further comprising a filter inductance of the secondary winding circuit that is sufficient to minimize ripple during normal operation but allows large ripple when the duty cycle is reduced.

18. A power converter system as claimed in claim 1 further comprising a capacitor in series with a primary winding in the primary winding circuit.

19. A power converter system as claimed in claim 1 further comprising a filter inductor in the secondary winding circuit.

20. A power converter system as claimed in claim 19 wherein the filter inductor is sufficient to minimize ripple during normal operation but allows large ripple when the duty cycle is reduced.

21. A power converter system as claimed in claim 1 wherein the regulation stages are down converters.

22. A power converter system as claimed in claim 1 wherein the output of the isolation stage is about 12 volts.

23. A power converter system as claimed in claim 22 wherein the regulation stage output is of a voltage level to drive logic circuitry.

24. A power converter system as claimed in claim 1 wherein the isolation stage is a step down stage.

25. A power converter system as claimed in claim 1 wherein the regulation stage output is of a voltage level to drive logic circuitry.

26. A power converter system as claimed in claim 1 wherein the regulation stage output is about 5 volts or less.

27. A power converter system as claimed in claim 1 wherein the regulation stage output is about 3.3 volts.

28. A power converter system as claimed in claim 1 wherein the DC power source provides a voltage that varies over the range of 36 to 75 volts.

29. A power converter system as claimed in claim 1 wherein the DC power source provides a voltage within the range of 36 to 75 volts.

30. A power converter system as claimed in claim 29 wherein the regulation stage output is of a voltage level to drive logic circuitry.

31. A method of converting power comprising:
providing an isolated output normally without regulation by:
providing power to primary and secondary transformer windings, there being a controlled rectifier having a parallel uncontrolled rectifier in series with the secondary transformer winding; and
controlling duty cycle of the power to the primary winding, the duty cycle causing substantially uninterrupted flow of power through the primary and secondary windings during normal operation; and
from the isolated output, providing plural regulated outputs without further isolation.

32. A method as claimed in claim 31 wherein the duty cycle of the primary winding circuit is reduced to cause freewheeling periods in other than normal operation.

33. A method as claimed in claim 32 wherein the controlled rectifiers are caused to be off during a portion of each cycle when the duty cycle is reduced.

34. A method as claimed in claim 32 wherein the duty cycle is a function of sensed current.

35. A method as claimed in claim 34 wherein the duty cycle is reduced to limit current.

36. A method as claimed in claim 32 wherein the duty cycle is reduced during start up.

37. A method as claimed in claim 32 wherein the duty cycle is a function of sensed current.

38. A method as claimed in claim 37 wherein the duty cycle is reduced to limit current.

39. A method as claimed in claim 31 wherein the power is applied to plural secondary windings.

40. A method as claimed in claim 31 wherein power is applied through a single primary winding and two secondary windings coupled to the single primary winding.

41. A method as claimed in claim 40 wherein the primary winding is in a full-bridge circuit.

42. A method as claimed in claim 41 wherein, during freewheeling, only two top FETs of the full bridge current are turned off.

43. A method as claimed in claim 41 wherein, during freewheeling, only two bottom FETs of the full bridge current are turned off.

44. A method as claimed in claim 41 wherein a capacitor is in series with the primary winding.

45. A method as claimed in claim 31 wherein the isolated output is applied to a capacitor.

46. A method as claimed in claim 31 wherein a control signal of the controlled rectifier is derived from a waveform of the secondary winding circuit.

47. A power converter system comprising:
primary and secondary transformer windings, there being a controlled rectifier having a parallel uncontrolled rectifier in series with the secondary transformer winding;
means for controlling duty cycle of the power to the primary winding, the duty cycle causing substantially uninterrupted flow of power through the primary and secondary windings during normal operation to provide an isolated output without regulation; and
means for providing plural regulated outputs, without further isolation, from the isolated output.

48. A system as claimed in claim 47 further comprising means for reducing the duty cycle of the primary winding circuit to cause freewheeling periods in other than normal operation.

* * * * *

UNITED STATES PATENT AND TRADEMARK OFFICE
CERTIFICATE OF CORRECTION

| | |
|---|---|
| PATENT NO. | : 7,272,021 B2 |
| APPLICATION NO. | : 11/407699 |
| DATED | : September 18, 2007 |
| INVENTOR(S) | : Martin F. Schlecht and Richard W. Farrington |

It is certified that error appears in the above-identified patent and that said Letters Patent is hereby corrected as shown below:

<u>On the Title page at Title (54) and Col. 1, line 1</u>
Please delete "Regulated" and insert --Regulation--.

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,272,021 B2 | Page 1 of 2 |
| APPLICATION NO. | : 11/407699 | |
| DATED | : September 18, 2007 | |
| INVENTOR(S) | : Martin F. Schlecht and Richard W. Farrington | |

It is certified that error appears in the above-identified patent and that said Letters Patent is hereby corrected as shown below:

<u>On the front page at Related U.S. Application Data (60)</u>

Please delete paragraph at (60): "Continuation-in-part of application No. 10/729,430, filed on Dec. 5, 2003, now Pat. No. 7,050,309, which is a continuation-in-part of application No. 10/812,314, filed on Mar. 29, 2004, now Pat. No. 7,072,190, which is a continuation of application No. 10/359,457, filed on Feb. 5, 2003, now Pat. No. 6,731,520, which is a division of application No. 09/417,867, filed on Oct. 13, 1999, now Pat. No. 6,222,742, which is a division of application No. 09/012,475, filed on Jan. 23, 1996, now Pat. No. 5,999,417, which is a continuation of application No. 09/821,655, filed on Mar. 29, 2001, now Pat. No. 6,594,159."

Insert new paragraph at (60) --Continuation-in-Part of U.S. Application No. 10/729,430, filed on December 5, 2003, and a Continuation-in-Part to U.S. Application No. 10/812,314, filed March 29, 2004, which is a continuation of Application No. 10/359,457, filed February 5, 2003, which is a continuation of Application No. 09/821,655, filed March 29, 2001, now U.S. patent 6,594,159, which is a divisional of Application No. 09/417,867, filed October 13, 1999, now U.S. patent 6,222,742, which

UNITED STATES PATENT AND TRADEMARK OFFICE
CERTIFICATE OF CORRECTION

PATENT NO. : 7,272,021 B2
APPLICATION NO. : 11/407699
DATED : September 18, 2007
INVENTOR(S) : Martin F. Schlecht and Richard W. Farrington It is certified that error appears in the above-identified patent and that said Letters Patent is hereby corrected as shown below:

is a divisional of 09/012,475, filed January 23, 1998, now U.S. patent 5,999,417.--

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,272,021 C1 | Page 1 of 1 |
| APPLICATION NO. | : 95/001206 | |
| DATED | : September 4, 2014 | |
| INVENTOR(S) | : Martin F. Schlecht et al. | |

It is certified that error appears in the above-identified patent and that said Letters Patent is hereby corrected as shown below:

On the Title page of the above-referenced U.S. Reexamination Certificate in item (73) Assignee section, please delete "Bank of America, N.A." and insert -- SynQor, Inc. --

Signed and Sealed this

Eleventh Day of November, 2014

Michelle K. Lee

*Deputy Director of the United States Patent and Trademark Office*

INTER PARTES REEXAMINATION CERTIFICATE (954th)
United States Patent
Schlecht et al.

(10) Number: US 7,272,021 C1
(45) Certificate Issued: *Sep. 4, 2014

(54) POWER CONVERTER WITH ISOLATED AND REGULATION STAGES

(75) Inventors: Martin F. Schlecht, Lexington, MA (US); Richard W. Farrington, Heath, TX (US)

(73) Assignee: Bank America, N.A., New York, NY (US)

Reexamination Request:
No. 95/001,206, Aug. 19, 2009

Reexamination Certificate for:
Patent No.: 7,272,021
Issued: Sep. 18, 2007
Appl. No.: 11/407,699
Filed: Apr. 20, 2006

Certificate of Correction issued Nov. 27, 2007
Certificate of Correction issued Apr. 22, 2008

(*) Notice: This patent is subject to a terminal disclaimer.

Related U.S. Application Data

(60) Continuation-in-part of application No. 10/729,430, filed on Dec. 5, 2003, now Pat. No. 7,050,309, which is a continuation-in-part of application No. 10/812,314, filed on Mar. 29, 2004, now Pat. No. 7,072,190, which is a continuation of application No. 10/359,457, filed on Feb. 5, 2003, now Pat. No. 6,731,520, which is a continuation of application No. 09/821,655, filed on Mar. 29, 2001, now Pat. No. 6,594,159, which is a division of application No. 09/417,867, filed on Oct. 13, 1999, now Pat. No. 6,222,742, which is a division of application No. 09/012,475, filed on Jan. 23, 1998, now Pat. No. 5,999,417.

(60) Provisional application No. 60/431,673, filed on Dec. 6, 2002, provisional application No. 60/036,245, filed on Jan. 24, 1997.

(51) Int. Cl.
*H02M 3/335* (2006.01)

(52) U.S. Cl.
USPC .............................................. 363/17; 363/97

(58) Field of Classification Search
None
See application file for complete search history.

(56) References Cited

To view the complete listing of prior art documents cited during the proceeding for Reexamination Control Number 95/001,206, please refer to the USPTO's public Patent Application Information Retrieval (PAIR) system under the Display References tab.

*Primary Examiner* — Linh M. Nguyen

(57) ABSTRACT

In a power converter, the duty cycle of a primary winding circuit causes near continuous flow of power through the primary and secondary winding circuits during normal operation. By providing no regulation during normal operation, a very efficient circuit is obtained with a synchronous rectifier in the secondary operating at all times. However, during certain conditions such as start up or a short-circuit, the duty cycle of the primary may be reduced to cause freewheeling periods. A normally non-regulating isolation stage may be followed by plural non-isolating regulation stages. To simplify the gate drive, the synchronous rectifiers may be allowed to turn off for a portion of the cycle when the duty cycle is reduced. A filter inductance of the secondary winding circuit is sufficient to minimize ripple during normal operation, but allows large ripple when the duty cycle is reduced. By accepting large ripple during other than normal operation, a smaller filter inductance can be used.

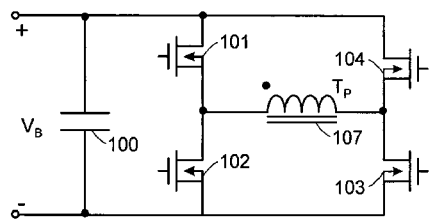

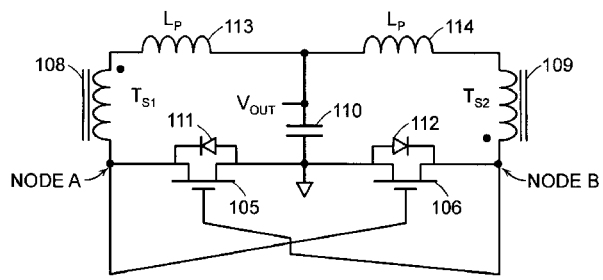

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1, 9, 15, 16, 21-27, 29-31, 39 and 45-47 is confirmed.

Claims 2-8, 10-14, 17-20, 28, 32-38, 40-44 and 48 were not reexamined.

* * * * *